Aug. 19, 1924.

L. JOHNSON

FLYING SHEARS

Filed Oct. 6, 1923

INVENTOR
Lane Johnson
By Byrnes, Stebbins & Barned
His Attys

Aug. 19, 1924.

L. JOHNSON

FLYING SHEARS

Filed Oct. 6, 1923

INVENTOR

Patented Aug. 19, 1924.

1,505,711

UNITED STATES PATENT OFFICE.

LANE JOHNSON, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

FLYING SHEARS.

Application filed October 6, 1923. Serial No. 666,925.

*To all whom it may concern:*

Be it known that I, LANE JOHNSON, a citizen of the United States, residing at Pittsburgh, county of Allegheny, and State of Pennsylvania, have invented a new and useful Improvement in Flying Shears, of which the following is a full, clear, and exact description.

The present invention relates broadly to metal cutting, and more particularly to shearing mechanism of the type ordinarily referred to as flying shears for shearing strip material delivered thereto by a strip mill.

An object of the invention is to provide a shear of the above type embodying means for operating the knives quickly and in such manner as not to interfere with the rapidly moving material, which may be delivered to the shear at a speed of from 600' to 1200' per minute, more or less.

Another object of the invention is to provide a shear requiring a relatively small amount of power for the operation of the knives.

A further object of the invention is to provide a shear embodying power means for operating the knives and means controlled by the moving material for controlling the operation of said knives by said power means, said means also being adapted to be manually controlled, whereby a predetermined length of crop end may be cut from any strip delivered to the shear.

In the accompanying drawings, there is shown, for purposes of illustration only, certain embodiments of the present invention, it being understood that the drawings do not define the limits of the invention, as changes may be made in the construction and operation therein disclosed without departing from the spirit of the invention or scope of my broader claims.

In the embodiment of the invention shown in Figures 1 to 7 inclusive, the shear comprises a frame 2 having vertical standards 3. A knife lever 4 is journaled at its upper end upon a horizontal pin 5, which is supported at its opposite ends in said standards. This lever carries at its lower end a knife 6. A cooperating knife 7 is carried by the upper end of a knife lever 8 having an integral sleeve 9 at its lower end journaled upon a bearing 10. The bearing 10 is provided at its opposite ends with eccentric trunnions 11 journaled in the standards 3. Interposed between the sleeve 9 and bearing 10 are anti-friction rollers 12.

Figure 4:
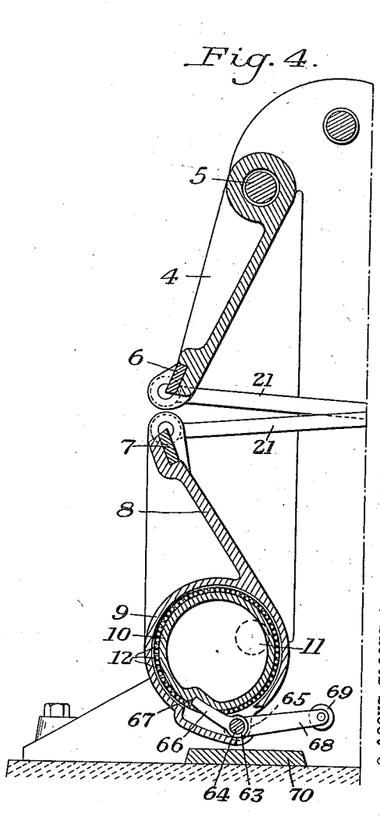
Figure 4 is a vertical sectional view taken on the line IV—IV of Figure 3.
Figure 5:
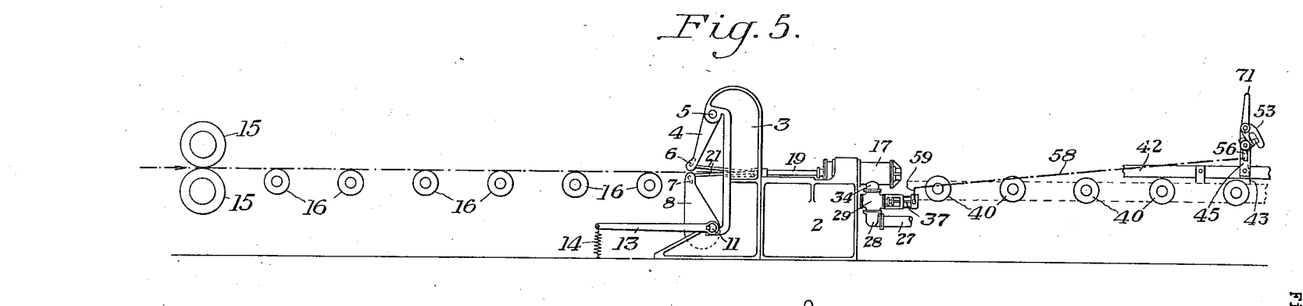
Figure 5 is a view corresponding to Figure 1, showing diagrammatically the roll tables associated with the shear.

A rocker arm 13 is keyed at one end upon one of the trunnions 11. A coil spring 14 is connected at one end to the free end of the lever 13 and is connected at its other end to the floor. The spring 14 tends to rotate the bearing 10 in a counterclock-wise direction and thereby lower the knife lever 8 and knife 7 so as to separate the knives, as illustrated in Figure 4. It is apparent that means other than a spring could be employed for this purpose, such, for example, as fluid pressure means.

The strip material is adapted to be fed from a last stand of rolls 15 to the shear over a suitable roll table 16 and the knives are adapted to be alternately moved in the direction of travel of the strips and in the reverse direction by fluid pressure means. This means may comprise a pair of fluid pressure cylinders 17, each having a piston 18 working therein and provided with a piston rod 19. Each piston rod has a pin 20 extending through the free end thereof and a pair of links 21 operatively connect each of said piston rods with said knife levers, each pair of links being journaled at one end upon the opposite ends of a pin 20 and pivotally connected at the other end to said knife levers, as shown more clearly in Figures 2, 3 and 4.

Figure 2:
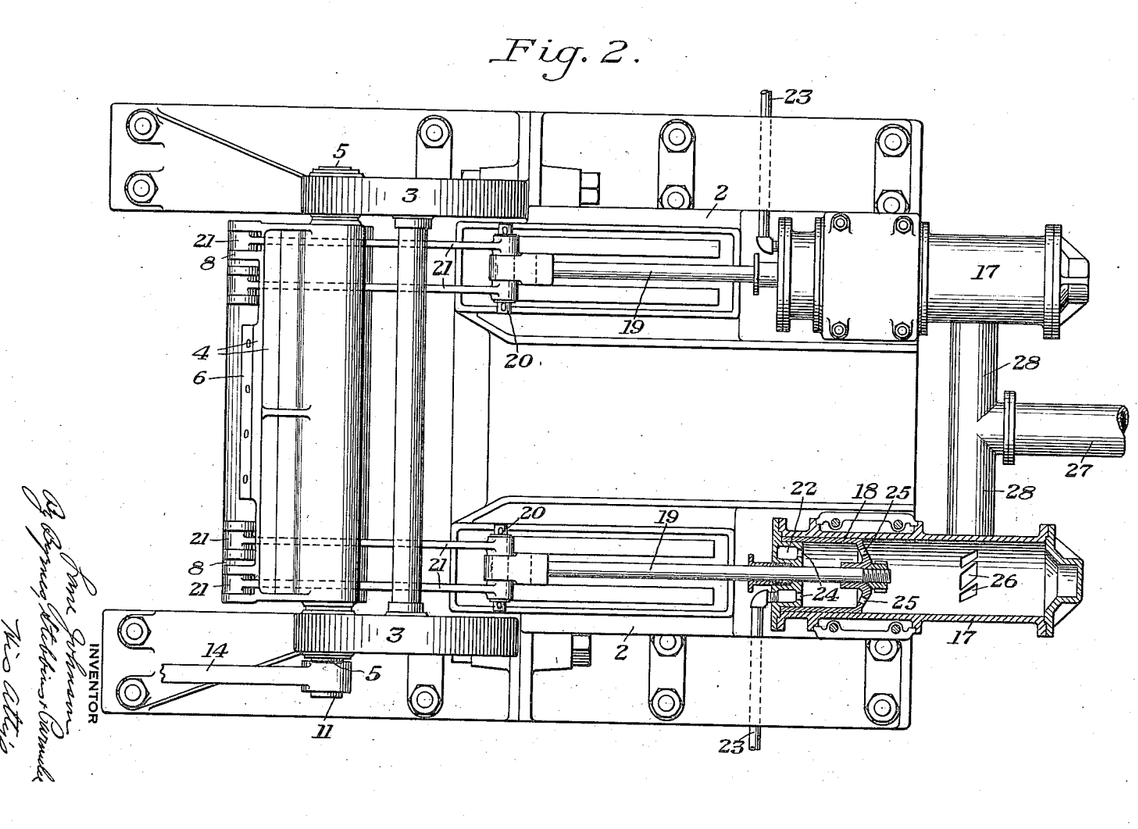
Figure 2 is a plan view of the shear shown in Figure 1.

The pistons 18 are adapted to be actuated by a suitable pressure fluid, preferably steam. The steam enters a chamber 22 at one end of each cylinder 17 through a pipe 23, which may have a suitable pressure controlling valve (not shown) associated therewith. From the chamber 22 the steam passes through a series of small openings 24 into the cylinder. Each piston 18 is hollow and is provided with a plurality of small openings 25, whereby the steam may pass to opposite sides of the piston. Since the effective area of each piston is less on the piston rod side than on the opposite side thereof, the pistons will normally be maintained by the steam pressure within the cylinders at the rear ends of the cylinders, as shown in Figure 2.

Figure 7:
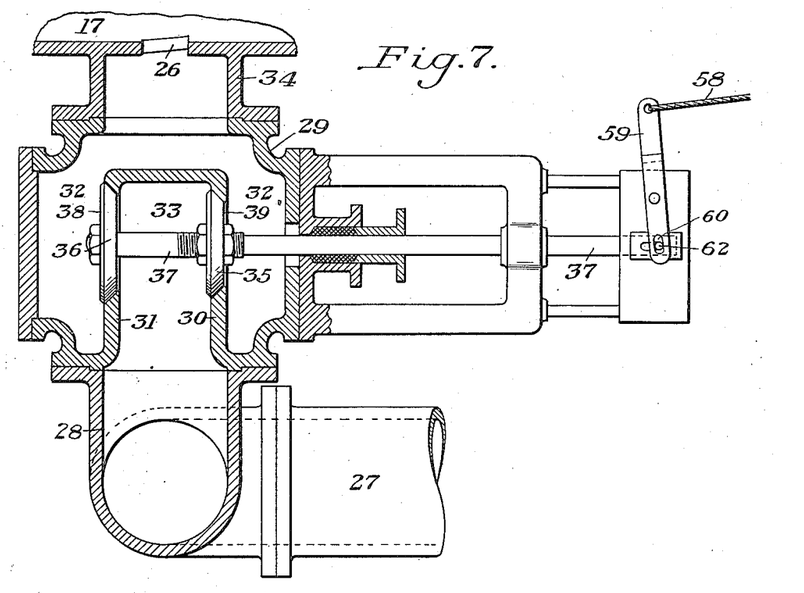
Figure 7 is a detail sectional view of a valve device employed in the construction shown in the preceding figures.

Each cylinder 17 is provided with an exhaust port 26 near the forward end thereof, the exhaust ports of the two cylinders communicating with an exhaust pipe 27 through branch pipes 28. Each exhaust port is controlled by an exhaust valve device. Referring to Figure 7, each exhaust valve device comprises a valve casing 29 having partition walls 30 and 31, dividing the interior of the casing into an inlet chamber 32 and an exhaust chamber 33. The inlet chamber 32 communicates with its exhaust port 26 through a connection 34 and the exhaust chamber 33 communicates with its branch pipe 28. The partition wall 30 is provided with a valve seat with which a valve 35 cooperates, and the partition wall 31 is provided with a valve seat with which a valve 36 cooperates, the valves 35 and 36 being rigidly connected by means of a valve stem 37. The outer surface 38 of valve 36 is of slightly greater area than the outer surface 39 of valve 35, whereby the pressure of the steam in the inlet chamber 32 normally maintains the valves 35 and 36 against their seats.

Figure 6:
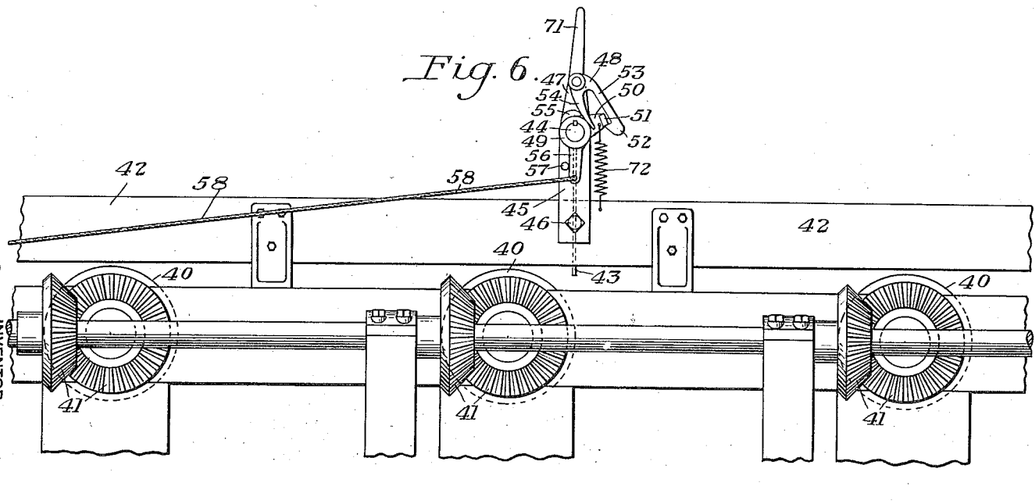
Figure 6 is a fragmentary view showing a portion of the delivery table and means associated therewith for controlling the operation of the shear.

The sheared material is delivered upon a delivery table 40, the rolls of which are driven in the usual manner by driving means 41 shown in Figure 6, said delivery table being adapted to move the sheared material at considerably greater speed than that at which the strips are fed to the shear. Means is associated with the guides 42 of the delivery table adapted to be actuated by the material for periodically opening and momentarily maintaining open the valves 35 and 36 of the valve devices. Referring to Figure 6, this means comprises a flag 43 depending into the path of travel of the material from a rock shaft 44. The latter is journaled at its opposite ends in brackets 45 which are adjustably secured to the guides 42 by means of set screws 46. In Figure 6, only one of the brackets is shown, but it will be understood that there is another bracket positioned at the opposite side of the delivery table. The rock shaft 44 has an upwardly extending rocker arm 47 adjacent each bracket 45 and each rocker arm has a gravity actuated latch or dog 48 pivotally mounted thereon. Keyed upon each end of the rock shaft 44 is a bell crank lever 49, one arm 50 of which has a lug 51 adapted to be engaged by a hook 52 on an arm 53 of the dog 48. The other arm 54 of the dog 48 cooperates with a cam surface 55 formed on the upper end of the adjacent bracket 45. The other arm 56 of the bell crank lever 49 is adapted to engage a stop 57 on the bracket 45 and this arm is connected by a cable 58 with the upper end of a lever 59 (Figure 7). This lever is pivoted intermediate its ends and is provided in its lower end with a slot 60. The stem 37 of the valves 35 and 36 of the corresponding valve device is provided at its free end with a pin 62 engaging in said slot 60. It will thus be seen that the valves 35 and 36 of the two valve devices are adapted to be simultaneously opened upon actuation of the flag 43.

Figure 1:
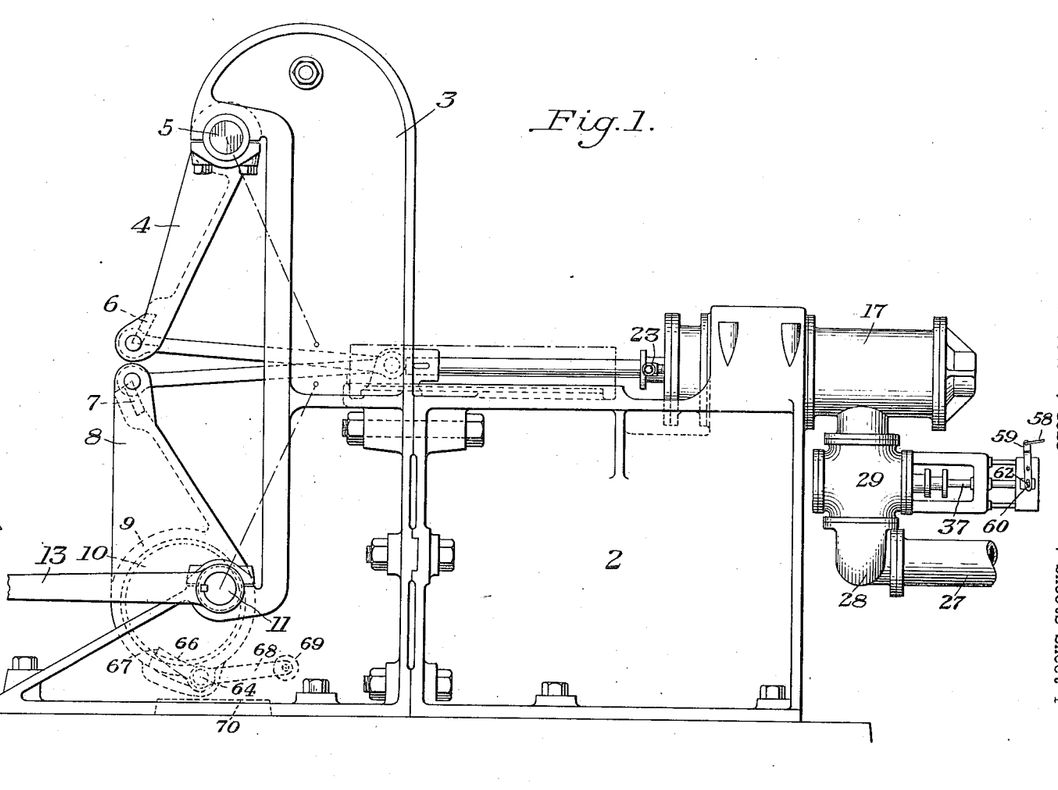
Figure 1 is a view in side elevation of one form of shear embodying my invention.
Figure 3:
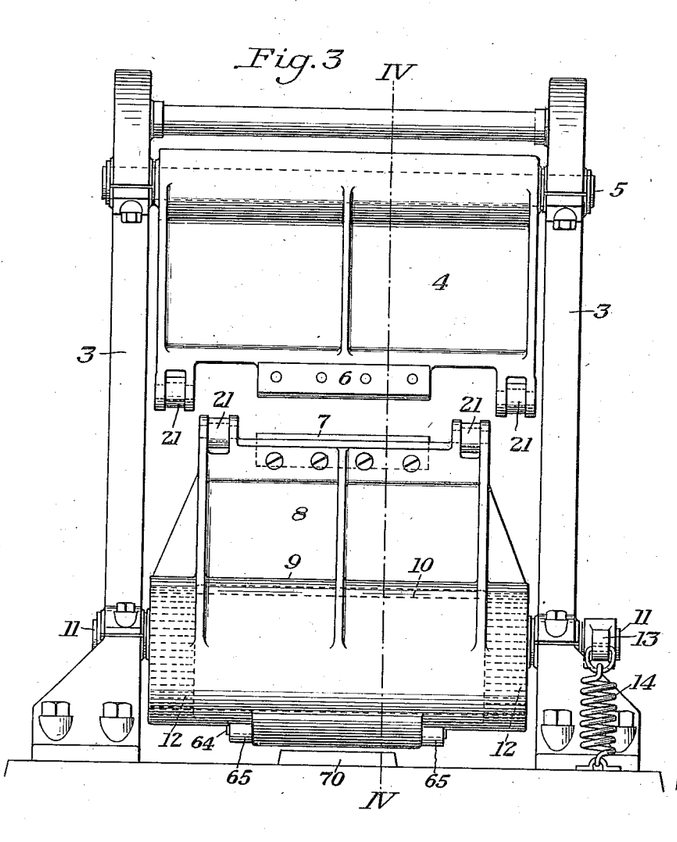
Figure 3 is an end elevation of the shear shown in Figure 1.

Referring to Figures 1, 3 and 4, the sleeve 9 of the knife lever 8 has a bell crank lever 63 pivotally supported therein by means of a pivot pin 64 which is journaled at its opposite ends in bearings 65. The shorter arm 66 of the lever 63 is adapted to engage a shoulder 67 on the bearing 10 and the longer arm 68 of said lever has a roller 69 mounted on the free end thereof. The weight of the arm 68 and roller 69 tends to maintain the shorter arm 66 in engagement with said shoulder 67, as shown in Figure 4, whereby when the knives 6 and 7 are moved in the direction of travel of the material, the bearing 10 is turned with the sleeve 9 and the lower knife lever 8 and its knife 7 are elevated by reason of the eccentric mounting of said bearing. At the instant that the cut is completed, however, when the knife levers 4 and 8 are in a substantially vertical position, the roller 69 engages a stationary stop 70 on the floor and further movement of the knives forwardly with the material causes the arm 66 to be swung out of engagement with the shoulder 67. At the instant that this happens, the spring 14 rocks the bearing 10 in a counter clock-wise direction, through the arm 13, thereby immediately lowering the lower knife lever 8 and its knife 7, so that, during the remainder of the forward stroke of the knives and during the rearward stroke of the same, the cutting edge of the knife 7 travels in a path which is at a lower elevation than the elevation of said cutting edge at the instant of cut. Therefore immediately after a cut is made, the knives are separated and remain separated until the instant that another cut is made. During the rearward stroke of the knives 6 and 7, the sleeve 9 of the lower knife lever 8 rotates in a counter clock-wise direction and near the end of said rearward stroke, the roller 69 moves out of engagement with the stop 70 and the shorter arm 66 of the bell crank lever 63 swings into engagement with the shoulder 67, thereby again locking sleeve 9 and bearing 10 together so that the bearing will rotate with the sleeve when the knives 6 and 7 move forwardly again.

The operation of the construction shown in Figures 1 to 7 inclusive may be briefly summarized as follows: Assuming the knives to be in the open position shown in Figure 4, the pistons 18 will be positioned at the rear ends of the cylinders, as shown in Figure 2. The operator, having decided upon the length of the pieces into which he desires to cut the strips, will position the flag 43 at the proper point on the guides 42 of the delivery table 40. Of course, it will be understood, that the correct positioning of the flag will have to be determined by experiment. The flag having been positioned, the delivery of the material to the shear may be commenced. In order to enable the operator to cut off the desired length of crop end from each strip, one of the rocker arms 47 may be provided with an upwardly extending handle 71. By actuating this handle the operator may momentarily open the exhaust valves 35 and 36 of the valve devices. As soon as he does so, the pressure of the steam in the cylinders 17 on the piston rod side of each of the hollow pistons 18 causes these pistons to be moved instantaneously forward, thereby forcing a portion of the steam in said cylinders on the other side of each of said pistons out though the exhaust ports 26. This causes the knives to be moved forwardly with the material and to make a cut, thereby severing a crop end from the strip. The opening of the valves 35 and 36 is only momentary and when the pistons near the end of their forward stroke, they cover the exhaust ports 26. When this occurs the further forward movement of the pistons is cushioned by the steam remaining in the cylinders in front of them and the steam pressure quickly builds up in the cylinders in front of the pistons, by reason of the openings 25 in said pistons, and said pistons are immediately returned to the rear position shown in Figure 2, owing to the fact, as already pointed out, that each piston has a greater effective area on its forward side than on its rear side. After the crop end has been cut off, the end of the strip will engage the flag 43 and thereby rock the bell crank levers 49 in a counter clock-wise direction, by reason of the engagement of the hooks 52 of the dogs 48 with the lugs 51. As soon, however, as the arms 54 of the dogs 48 engage the cam surfaces 55, the hooks 52 will be swung out of engagement with the lugs 51 and coil springs 72 connected to the arms 50 will immediately swing the arms 56 against the stops 57, thereby permitting the valves 35 and 36 to close. A piece will therefore be cut from the strip of a length determined by the distance of the flag 43 beyond the knives. After a cut has been made, the flag will remain in engagement with the severed piece until said piece passes out of engagement with said flag. When this occurs, the flag will immediately drop to the position shown in Figure 6 and the hooks 52 will snap into engagement with the lugs 51, whereby the parts will be in position for again opening the valves as soon as the flag is engaged by the end of the oncoming strip, it being obvious that there is always a clearance between the rear end of a severed piece and the forward end of the remainder of the strip.

It will be apparent that with the construction above described, a strip may be cut into pieces of any desired length as determined by the positioning of the flag 43 on the guides of the delivery table. Furthermore, any desired length of crop end may be cut off of each strip by manipulating the handle 71 at the proper instant. The pressure of the operating fluid, such as steam, may be regulated to cause the knives 6 and 7 to be moved forwardly in the direction of travel of the strip in such manner that at the instant of cut these knives will be traveling at the same speed as that of the strip as delivered from the last stand of rolls, and this regulation of the speed of travel of the knives in the direction of travel of the strip may be secured irrespective of the length of the pieces into which the strip is cut, as determined by the positioning of the flag. Furthermore, the provision of means for lowering the lower knife immediately after each cut and maintaining it in the lowered position during the rearward stroke of the knives insures non-interference of the knives with the strip irrespective of the speed of the strip. The construction and arrangement of the knife levers is of importance as regards the amount of power required to operate the knives. It will be seen that these knife levers act somewhat on the principle of toggle levers, said levers being in substantially the same vertical plane while a cut is being made. Furthermore, it will be noted, by reference to Figures 3 and 4, that the axis of the pivotal connection of each lever with its pair of links 21 substantially coincides with the edge of the knife carried by said lever. By reason of this construction and arrangement, the force required to operate the knives will be small in comparison to the resistance offered by the material to being sheared, as will be apparent.

In the modified construction shown in Figures 8 to 14 inclusive, the eccentric bearing 10' for the lower knife lever is arranged to be rotated in timed relation to the operation of the knife levers and variation of the length of the pieces into which the strips are cut is secured by varying the speed of rotation of said bearing while maintaining the speed of travel of the knives constant and equal to the speed of travel of the strips as delivered by the last stand of rolls.

Figure 8:
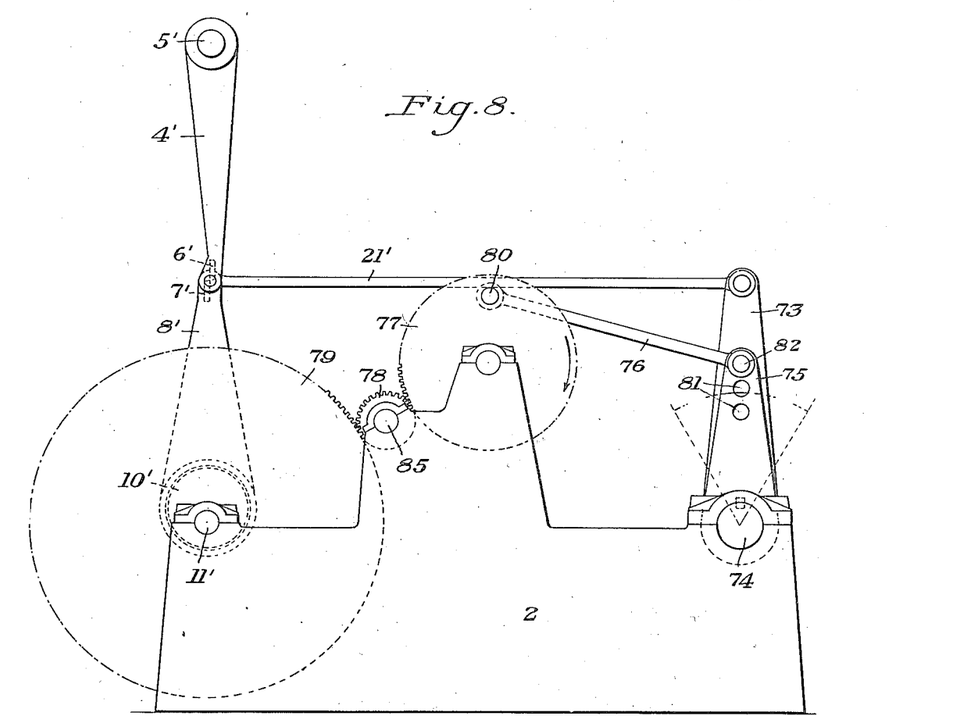
Figure 8 is a view in side elevation of a modified form of shear embodying my invention.
Figure 15:
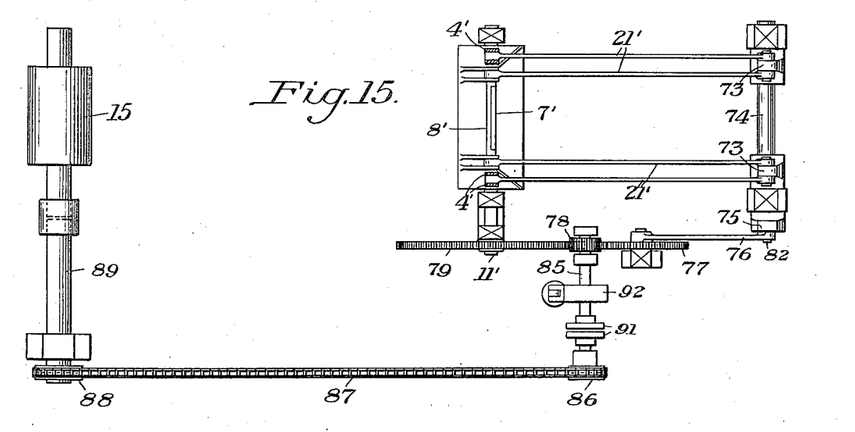
Figure 15 is a view illustrating a modified form of driving means for the shear shown in Figure 8.

Referring to Figure 8, which is a more or less diagrammatic view, upper and lower knife levers 4' and 8', carrying cooperating knives 6' and 7', are connected by links 21' with rocker arms 73 carried by a rock shaft 74. It will be understood that there are two pairs of links 21' corresponding to the links 21 shown in Figure 2 and that there is a rocker arm 73 at each side of the path of travel of the strips, as shown in Figure 15. The rock shaft 74 also carries a shorter rocker arm 75 which is connected by a connecting rod 76 with a crank gear 77. The gear 77 meshes with a driving pinion 78, which in turn meshes with a gear 79 keyed upon one of the eccentric trunnions 11' of the bearing 10' of the lower crank lever 8'.

Figure 10:
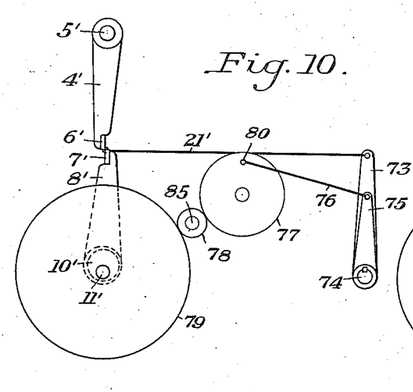
Figures 10, 11, 12 and 13 are diagrammatic views illustrating different operative positions of the parts shown in Figure 8.
Figure 11:
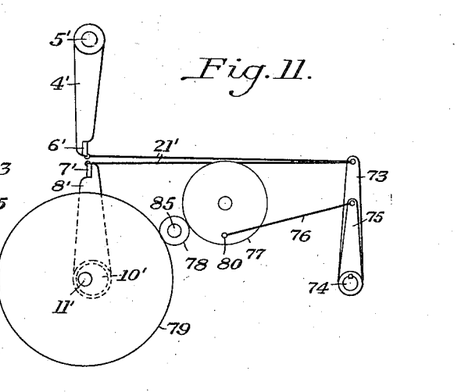
Figure 12:
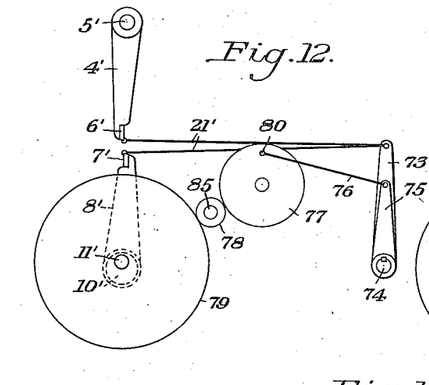
Figure 13:
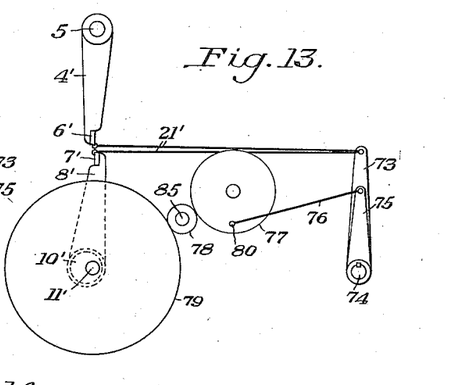

The operation of the construction shown in Figure 8 is as follows: Let it be assumed that a strip as delivered by the last stand of rolls is traveling at the rate of 1200' per minute and that it is desired to cut this strip into pieces having a length of 30'. In that case, the gear 79 should make 40 revolutions per minute in order that the knives 6' and 7' may come into cutting position forty times per minute. Let it be further assumed that the gear ratio between gears 79 and 77 is 1 to 2. In that case, the gear 77 will make 80 revolutions per minute. Now if the length of the crank circle in which the crank pin 80 travels is 10', the said crank pin will travel at the rate of 800' per minute when the gear 77 is making 80 revolutions per minute. Therefore, if it is desired to cause the knives 6' and 7' to move in the direction of travel of the strip at the same speed as the strip, the length of the rocker arms 73 with respect to the length of the rocker arm 75 should be in the same ratio as the speed of travel of the strip is to the speed of travel of the crank pin 80, or as 1200 is to 800, or 1½ to 1. Therefore if we assume a length of 3' for the rocker arm 75, the length of the rocker arms 73 should be 4½'. With the above assumed gear ratio, 1 to 2, between gears 79 and 77, the operation would be as illustrated in Figures 10 to 13 inclusive. Figure 10 shows the knives in cutting position. Figure 11 shows the position of the parts when the crank pin 80 has made a half revolution. During this movement of the crank pin, knives 6' and 7' have been moved forwardly from the cutting position shown in Figure 10 to the limit of their movement in the forward direction, and then have been moved back to the position shown in Figure 11. During this movement of the knives the eccentric bearing 10' has made one-quarter revolution, thereby lowering the lower knife 7'. Figure 12 shows the position of the parts after the crank pin 80 has made another half revolution. During this movement of the crank pin, the knives 6' and 7' have been moved rearwardly to the limit of their path of movement in the rearward direction and then have again been moved forwardly to the position shown in Figure 12. During this movement of the knives, the lower knife 7' has been further lowered by reason of the fact that the eccentric bearing 10' has completed one-half of a revolution. Figure 13 shows the position of the parts after the crank pin 80 has made another half revolution. During this movement of the crank pin, the knives 6' and 7' have again been moved forwardly to the limit of their movement in the forward direction and then have been moved rearwardly to the position shown in Figure 13. During this movement of the knives, the lower knife 7' has been elevated to the same position which it occupied in Figure 11, by reason of the fact that the eccentric bearing 10' has now completed three-quarters of a revolution. Figure 10 shows the position of the parts after the crank pin 80 has completed two revolutions. During the movement of the crank pin 80 from the position shown in Figure 13 back to the starting position shown in Figure 10, the knives 6' and 7' have again been moved rearwardly to the limit of their movement in the rearward direction, and have then been moved forwardly to the cutting position shown in Figure 10. In this position of the parts, the lower knife 7' has been elevated into the cutting position, by reason of the fact that the eccentric bearing 10' has now made a complete revolution. It will be seen that with this gear ratio, the knives 6' and 7' will complete two cycles of movement in the direction of travel of the strip and in the opposite direction while making one cut.

Now let it be assumed that the strips are traveling at the same speed, that is, 1200' per minute, and that it is desired to cut them into pieces having a length of, say, 40' instead of 30', while still maintaining the speed of travel of the knives in the direction of travel of the strips at the same speed as that of the strips. This may be accomplished in several ways, as by changing the ratio between gears 79 and 77 and the ratio between the rocker arms 73 and 75. A simple way of accomplishing this result, however, is to let the ratio between the gears 79 and 77 remain unchanged and to reduce the speed of rotation of said gears. For example, it being desired to cut the strips into pieces having a length of 40', the gear 79 should make 30 revolutions per minute. Therefore, with a ratio of 1 to 2 between the gears 79 and 77, the gear 77 would make 60 revolutions per minute and the crank pin 80 would travel at the rate of 600' per minute. Then the ratio between the lengths of the rocker arms 73 and 75 should be as 2 to 1, and if the length of the rocker arms 73 remains 4½', the length of the rocker arm 75 should be reduced to 2¼'. This may effectively be accomplished by providing the rocker arm 75 with a series of holes 81 at different distances from the axis of the rock shaft 74. By placing the pin 82, upon which the end of the connecting rod 76 is journaled, in the proper one of the holes 81, the desired effective length of the rocker arm 75 may be secured.

Figure 9:
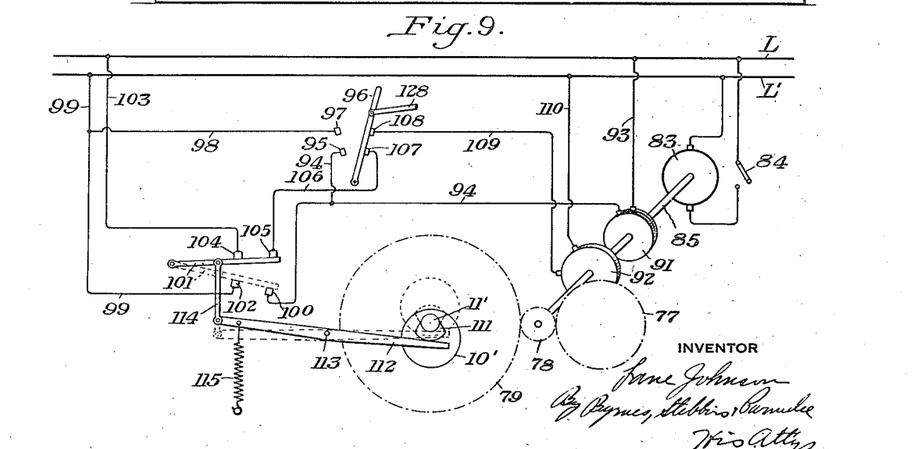
Figure 9 is a wiring diagram of the electrical control means for the shear shown in Figure 8.

The driving pinion 78 may be driven by any suitable means and in Figure 9 I have shown an electric motor 83 for this purpose supplied with current from lines L and L', a hand switch 84 being provided for controlling the starting and stopping of the motor. Another convenient way of driving the pinion 78 would be to provide a sprocket wheel on its shaft 85 and drive through a sprocket chain connecting such sprocket wheel with a sprocket wheel associated with one of the rolls 15 of the last stand of rolls. Such a modified form of driving means is illustrated in Figure 15, in which the shaft 85 of the pinion 78 has a sprocket wheel 86 mounted thereon connected by a sprocket chain 87 with a sprocket wheel 88 on a shaft 89 operatively connected with one of the rolls 15 of the last stand of rolls. When an electric motor is utilized for driving the pinion 78, the speed of this pinion may be regulated by regulating the speed of the motor and when the pinion is driven from the last stand of rolls, as illustrated in Figure 15, the speed of the pinion may be regulated by changing the size of the sprocket wheel 86.

The pinion 78 is adapted to be driven from the motor 83 or from the last stand of rolls through a magnetic clutch 91 and an electrically operated brake 92 is also provided on the shaft 85 for stopping the rotation of the pinion 78 when the magnetic clutch is de-energized. Referring to the wiring diagram of Figure 9, one side of the magnetic clutch is connected with the line L through a conductor 93. The other side of said clutch is connected with the line L' through a conductor 94 leading from said clutch to a stationary contact 95 adapted to be connected by a switch lever 96 with another stationary contact 97, the latter being connected by a conductor 98 with a conductor 99 connected to the line L'. Another circuit for the magnetic clutch is from line L through the conductor 93 to the clutch and from the clutch through conductor 94 to a stationary contact 100 adapted to be connected by a switch lever 101 with another stationary contact 102 connected by the conductor 99 with the line L'. The circuit for the brake 92 is from the line L through a conductor 103 to a stationary contact 104 adapted to be connected by the switch lever 101 with another stationary contact 105 connected by a conductor 106 with a stationary contact 107 adapted to be connected with another stationary contact 108 by the switch lever 96. The contact 108 is connected with the clutch by a conductor 109 and a conductor 110 leads from said clutch to the line L'.

Assuming the switch levers 96 and 101 in the positions shown in Figure 9, the circuit to the brake 92 is closed and the circuit to the magnetic clutch is open. The pinion 78 is therefore disconnected from its driving means. If the switch lever 96 is now moved to a position to bridge contacts 95 and 97, the circuit to the brake will be opened and the circuit to the clutch closed, which will result in the pinion 78 being operatively connected to its driving means. It will be apparent that this construction enables the operator to control the starting and stopping of the operation of the shear at will by manipulating the switch lever 96, whereby any desired length of crop end may be cut off of each strip by closing the clutch circuit at the proper moment.

It is desirable that the shear always be stopped at the moment when the knives are in the separated position shown in Figure 12. This is accomplished by providing a cam 111 on one of the trunnions 11' for cooperation with a lever 112 pivoted at 113 and operatively connected with switch lever 101 through a link 114, a spring 115 being provided for maintaining the lever 112 in engagement with said cam. The cam is so positioned with respect to the eccentric bearing 10' that when said bearing is in its lowermost position, as shown in full lines in Figure 9, the switch lever 101 will bridge the stationary contacts 104 and 105. When the bearing is in the raised position shown in dotted lines in Figure 9, the switch lever 101 will be in the dotted line position shown in Figure 9, bridging the stationary contacts 100 and 102. If the operator moves the switch lever 96 into position to bridge the stationary contacts 107 and 108 for stopping the shear, the shear will immediately be stopped provided the switch lever 101 is bridging the contacts 104 and 105. If, however, the switch lever 101 is in the dotted line position shown in Figure 9, the shear will not immediately stop, because of the fact that in this position of the switch lever 101 the circuit to the clutch is closed and the circuit to the brake opened. When the switch lever 101 is moved into position to bridge the contacts 104 and 105, the circuit to the brake is closed and the circuit to the clutch opened. The provision of the switch lever 101 operated by the cam 111 therefore insures the stopping of the shear with the knives in the position shown in Figure 12.

Figure 14:
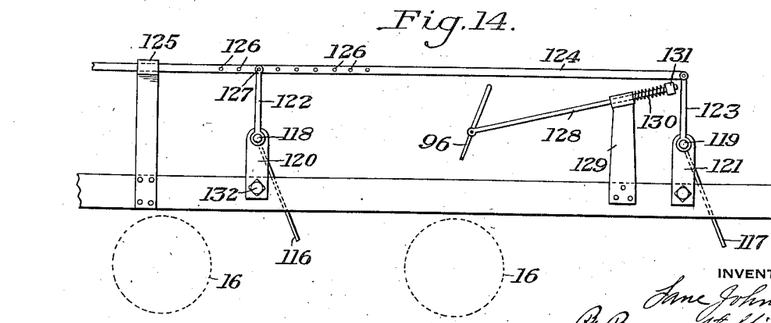
Figure 14 is a fragmentary view of a portion of a roll table and means associated therewith for controlling the operation of the shear shown in Figure 8.

The switch lever 96 may be operated by hand, as has already been explained, and it may also be operatively connected with a flag or flags adapted to be positioned over the roll table 16 in front of the knives. Referring to Figure 14, a pair of flags 116 and 117 are carried by rock shafts 118 and 119 journaled in brackets 120 and 121. These rock shafts have upwardly extending rocker arms 122 and 123 which are operatively connected by means of a connecting bar 124. Said bar is mounted for reciprocation in a suitable guide 125 and is pivotally connected at one end to the end of the rocker arm 123. Said bar is provided with a plurality of holes 126 and the rocker arm 122 is adapted to be connected to the bar 124 by means of a pivot pin 127 adapted to be positioned in any one of said holes. A rod 128 is slidably mounted in a bracket 129 and is pivotally connected at one end to the switch lever 96. A coil spring 130 surrounds the rod 128 between a collar 131 on the other end thereof and the bracket 129. This spring tends to normally maintain the switch lever in position to bridge the contacts 107 and 108. The brackets 120, one on each side of the roll table 16, in which the rock shaft 118 is journaled may be positioned at any desired point along said roll table, set screws 132 being provided for clamping the brackets in adjusted position. When the end of a strip comes in contact with the flag 116, the said flag is swung in a counter clock-wise direction, thereby rocking the rocker arm 122 rearwardly, and, through the connecting bar 124, rocking the rocker arm 123 in the same direction. When this occurs, the latter rocker arm engages the end of the rod 128 and moves the latter rearwardly, compressing the spring 130. This results in moving the switch lever 96 in position to bridge the contacts 95 and 97, thereby effecting the starting of the operation of the shear. It will be seen that by properly positioning the brackets 120 along the roll table 16, any desired length of crop end may be cut off of a strip. After a strip has engaged the flag 116, the clutch circuit will remain closed so long as the strip is in contact with said flag. If only the one flag 116 were provided, the circuit of the clutch would be opened and the circuit to the brake closed at the instant that the strip moved out of contact with the flag 116 allowing the latter to drop. This might result in the stopping of the operation of the shear too soon. In other words, if the strip was being cut into pieces having a length of, say, 30', the last piece might have a length of 40' to 45' due to the stopping of the operation of the shear by reason of the dropping of the flag 116 too soon. In order to obviate this difficulty, the second flag 117 is provided and operatively connected to the flag 116 as shown. The flag 117 may be placed close to the knives so that the same will not be allowed to drop until after the last desired cut has been made.

With the construction shown in the modified form of the invention above described, the strips may be cut into pieces of any desired length while continuously operating the knives and maintaining the speed of travel of the same constant and equal to the speed of travel of the strips. Moreover, this construction also insures the lowering of the lower knife immediately after each cut is made and the maintenance of said knife in the lowered position throughout the rearward stroke of the knives. The electrical control means shown, insures the stopping of the operation of the shear always with the knives in the separated position shown in Figure 12 and also enables any desired length of crop end to be cut off of each strip.

I claim:

1. In a shear, a pair of pivotally mounted knife levers, cooperating knives carried by said levers, means for swinging said levers about their pivotal axes to effect reciprocation of said knives in the direction of travel of the material and in the opposite direction, and means for simultaneously producing a relative movement of said axes towards and from each other transversely of the path of travel of the material to effect first a shearing of the material and then a sufficient separation of the knives to avoid interference between the same and the material during the rearward movement of the knives, substantially as described.

2. In a shear, a pair of knife levers, one of said levers being pivoted upon a fixed and the other upon a movable axis, means for oscillating said levers about their pivotal axes to effect reciprocation of said knives in the direction of travel of the work and in the opposite direction, and means for simultaneously moving said movable axis towards and from said fixed axis to effect first a shearing of the material and then a sufficient separation of the knives to avoid interference between the same and the material during the rearward movement of the knives, substantially as described.

3. In a shear, a pair of pivotally mounted knife levers, cooperating knives carried by said levers, and means for continuously oscillating said levers about their pivotal axes to effect movement of the knives in the direction of travel of the material at the speed of said material and in the opposite direction and for simultaneously producing a relative movement of said axes towards and from each other to effect alternately a shearing of the material and then a sufficient separation of the knives to avoid interference between the same and the material during the rearward movement of the knives, said means having provision for varying the interval between successive cuts while maintaining the speed of the knives in the direction of travel of the material constant, substantially as described.

4. In a shear, a pair of cooperating knives, a pivotally mounted knife lever supporting one of said knives, means for reciprocating said knives in the direction of travel of the material and in the opposite direction and thereby oscillating said lever about its pivotal axis, and means for simultaneously effecting a reciprocation of said axis transversely of the path of travel of the material to effect first a shearing of the material and then a sufficient separation of the knives to avoid interference between the same and the material during the rearward movement of the knives, substantially as described.

5. In a shear, a pair of pivotally mounted knife levers, cooperating knives carried by said levers, power means operatively connected to said levers for swinging the same about their pivotal axes to effect reciprocation of said knives in the direction of travel of the material and in the opposite direction, means positioned in the path of the moving material and adapted to be actuated by the latter for controlling the operation of said levers by said power means, and means for effecting a relative movement of said pivotal axes towards and from each other simultaneously with the reciprocation of said knives, substantially as described.

6. In a shear, a pair of pivotally mounted knife levers, cooperating knives carried by said levers, power means operatively connected to said levers for swinging the same about their pivotal axes to effect reciprocation of said knives in the direction of travel of the material and in the opposite direction, means positioned in the path of the moving material and adapted to be actuated by the latter for controlling the operation of said levers by said power means, said means being manually operable for causing any desired length of crop end to be cut from each strip, and means for effecting a relative movement of said pivotal axes towards and from each other simultaneously with the reciprocation of said knives, substantially as described.

7. In a shear, a pair of pivotally mounted knife levers, cooperating knives carried by said levers, power means operatively connected to said levers for swinging the same about their pivotal axes to effect reciprocation of said knives in the direction of travel of the material and in the opposite direction, means positioned in the path of the moving material and adapted to be actuated by the latter for controlling the operation of said levers by said power means, said means being either manually operable or operable by the moving material for causing any desired length of crop end to be cut from each strip, and means for effecting a relative movement of said pivotal axes towards and from each other simultaneously with the reciprocation of said knives, substantially as described.

8. In a shear, an upper knife lever pivoted at its upper end, a lower knife lever pivoted at its lower end, cooperating knives carried by the free ends of said levers, the pivotal axes of said levers lying in substantially the same vertical plane and the length of said levers being such that the cutting edges of the knives pass each other when said levers are both in substantially the same vertical plane as said axes, means for oscillating said levers to cause said knives to alternately move in the direction of travel of the moving material and in the opposite direction, and means for simultaneously effecting a relative movement of said pivotal axes towards and from each other, substantially as described.

9. In a shear, an upper knife lever pivoted at its upper end, a lower knife lever pivoted at its lower end, cooperating knives carried by the free ends of said levers, the pivotal axes of said levers lying in substantially the same vertical plane and the length of said levers being such that the cutting edges of the knives pass each other when said levers are both in substantially the same vertical plane as said axes, means operatively connected to the free ends of said levers for oscillating the same to cause said knives to alternately move in the direction of travel of the moving material and in the opposite direction, and means for simultaneously effecting a relative movement of said pivotal axes towards and from each other, substantially as described.

10. In a shear, an upper knife lever pivoted at its upper end, a lower knife lever pivoted at its lower end, cooperating knives carried by the free ends of said levers, the pivotal axes of said levers lying in substantially the same vertical plane and the combined length of said levers being substantially equal to the distance between said pivotal axes, means operatively connected to the free ends of said levers for oscillating the same to cause said knives to alternately move in the direction of travel of the moving material and in the opposite direction, and means for simultaneously effecting a relative movement of said pivotal axes towards and from each other, substantially as described.

11. A shear, comprising upper and lower knife levers, cooperating knives carried by said levers, an eccentric bearing for the lower lever, means for operating said levers to alternately move said knives in the direction of travel of the material and in the opposite direction, yielding means tending to normally maintain said bearing in a lowered position, detent means carried by the lower lever for engaging said bearing and raising the same during the forward stroke of said knives, and means for actuating said detent means to release said bearing immediately after the cut and preceding the commencement of the rearward stroke of said knives, substantially as described.

12. A shear, comprising a pair of cooperating knives, power means adapted to continuously actuate said knives, and means adapted to be actuated by the moving material to be sheared for controlling the time of commencement of the operation of said knives by said power means, substantially as described.

13. A shear, comprising a pair of cooperating knives, power means adapted to continuously actuate said knives, and means adapted to be actuated by the moving material to be sheared for controlling the time of commencement of the operation of said knives by said power means, said means being adjustable to vary the said time of commencement, substantially as described.

14. A shear comprising a pair of cooperating knives, power means adapted to continuously actuate said knives, and means adapted to be actuated by the moving material to be sheared for controlling the time of commencement of the operation of said knives by said power means, said means being manually operable for effecting the said commencement of operation of said knives, substantially as described.

15. A shear, comprising a pair of cooperating knives, power means adapted to continuously actuate said knives, and means adapted to be actuated by the moving material to be sheared for controlling the times of commencing and stopping of the operation of said knives by said power means, substantially as described.

16. A shear, comprising a pair of upper and lower cooperating knives, power means adapted to continuously alternately move said knives in the direction of travel of the material and in the opposite direction, means for separating the knives preceding the rearward stroke thereof, and means controlled by the moving material to be sheared for controlling the time of stopping of the operation of said knives by said power means, said means insuring stopping of the knives in separated position, substantially as described.

In testimony whereof I have hereunto set my hand.

LANE JOHNSON.